US005251141A

United States Patent [19]

Payr

[11] Patent Number: 5,251,141

[45] Date of Patent: Oct. 5, 1993

[54] APPARATUS FOR DIVIDING WORKPIECES ESPECIALLY OF WOOD

[76] Inventor: Hans Payr, Graben 1, A-9560 Feldkirchen Pointschach (Karnten), Austria

[21] Appl. No.: 542,417

[22] Filed: Jun. 22, 1990

[30] Foreign Application Priority Data

Jun. 26, 1989 [AT] Austria ................................ 1558/89

[51] Int. Cl.[5] ......................... G06F 15/46; B27B 13/00

[52] U.S. Cl. ................................ 364/474.09; 144/357; 144/378; 83/367

[58] Field of Search ............... 364/468, 474.09; 83/71, 83/72–75, 368, 418, 367; 144/312, 376–378, 357, 356; 358/101, 107

[56] References Cited

U.S. PATENT DOCUMENTS 4,458,567 7/1984 Tuomaala ................................ 83/13
4,471,823 9/1984 Wadell ........................... 364/474.09
4,688,296 8/1987 Clarke et al. ......................... 452/159
4,879,659 11/1989 Bowlin et al. ........................ 364/468
4,941,100 7/1990 McFarlane et al. ........... 364/474.09
4,977,805 12/1990 Corley, III ...................... 364/474.09
5,119,310 6/1992 Moriya .................................... 83/71

FOREIGN PATENT DOCUMENTS 0230297 7/1987 European Pat. Off. .
1918599 10/1970 Fed. Rep. of Germany .
2740985 3/1978 Fed. Rep. of Germany .

*Primary Examiner*—Jerry Smith
*Assistant Examiner*—Thomas E. Brown
*Attorney, Agent, or Firm*—Young & Thompson

[57] ABSTRACT

A television camera (4) is provided in the region of a band saw (1) so that, in the latter, the wood (7), firmly placed on a band saw carriage (2) to be adjustable transversely to the dividing plane (6') of the band saw (1), can be aligned with respect to the band saw (1). An image of the end face of the wood (7) to be divided which faces the band saw (1) is produced on a television screen (5). A line (6) symbolizing the plane (6') wherein the band saw (1) operates is provided on the television screen (5). In this way, it is possible to determine from the television screen (5) whether the wood (7) is correctly aligned with respect to the band saw (1) and/or to observe the aligning of the wood (7).

11 Claims, 5 Drawing Sheets

APPARATUS FOR DIVIDING WORKPIECES ESPECIALLY OF WOOD

FIELD OF THE INVENTION

The invention relates to an apparatus for dividing workpieces, especially wood, wherein a tool for dividing the workpiece, for example a band saw or a frame saw, and the workpiece are movable relatively to each other along a predetermined travel route for performing the dividing work, and wherein the workpiece is fixed on a support to be adjustable transversely to the dividing plane, with an image recorder covering the workpiece, preferably a television camera.

BACKGROUND OF THE INVENTION

The setting up of round timber or other workpieces to be split, up by a dividing means, particularly in the longitudinal direction, with respect to the dividing tool (band saw, frame saw, or the like), which is important for optimum guidance of the dividing plane (cutting plane), especially in sawmill operation, is executed, if auxiliary means are at all provided for this purpose, with the aid of light beams (shadows) or with the help of a laser beam.

These conventional measures have the drawback that the work place must always be in darkness since light beams (shadows) or laser beams can hardly be seen, or cannot be seen at all, in sunlight and/or daylight. Recognition is practically not possible at all if wood in its bark is to be split up. When using a laser beam for setting up purposes, the cutting plane can be indicated only at a relatively short range (4–6 m).

Another disadvantage in the conventional measures resides in that the operator must constantly watch the wood or other workpiece to be divided, requiring continuous head movements which are very tiring.

A further drawback of the known measures resides in that adjustment of the workpiece to be split with the aid of a laser beam requires a very expensive arrangement.

Moreover, the operator must be in the immediate vicinity of the workpiece (wood) to be divided in order to be able at all to perform setting up (adjustment) of the workpiece to be divided.

DE-A-2,740,985 discloses a device for the measurement, setting, and feeding of tree trunks to a frame saw. In this conventional device, three television cameras are mounted so that they cover the tree trunk, to be fed to the frame saw, from above and transmit data corresponding to its outer contour to a computer; the latter controls a turning means for the tree trunk resting on the trunk carriages, which is linked to the carriages, in such a way that the log is maximally favorably aligned with regard to the cutting plane.

A similar apparatus is set forth in U.S. Pat. No. A-4,458,567 wherein two cameras are arranged laterally above a log; the log is to be oriented in such a way that the images of contours detected by the cameras are essentially mirror images of one another.

Neither the cameras provided in the device according to DE-A-2,740,985 nor those in the device in accordance with U.S. Pat. No. A-4,458,567 cover the end face of the workpiece to be divided, but rather detect merely its longitudinal sides so that it is merely possible with the known devices to turn logs to be split up into the position favorable for performing a dividing cut. The conventional devices, though, involve comparatively complicated installations utilizing computers which control the necessary turning movements of the log.

SUMMARY OF THE INVENTION

The invention is based on the object of providing an apparatus of the above-discussed type which operates in a simple and reliable fashion and does not exhibit the above-enumerated disadvantages.

This has been accomplished in accordance with this invention in that the image recorder, detecting at least the end face of the workpiece to be split up, is mounted in the dividing plane of the dividing tool or, respectively, in case of a dividing tool with several dividing planes, in one of its dividing planes; that the image recorder is connected with a monitor, preferably a television screen, on which there is produced an image of at least the end face of the workpiece to be divided which faces the dividing tool and the image recorder; and that at least one line symbolizing the plane in which the dividing tool is effective is provided on the monitor.

When working with the apparatus according to this invention, the operator can observe from the monitor how the workpiece is to be adjusted with respect to the dividing tool for optimum alignment of the dividing plane. Thus, it is no longer necessary for the operator to see the workpiece proper and the light or laser marker produced thereon. Consequently, work can be performed with the apparatus of this invention even over relatively long distances, i.e. the operator need no longer be stationed in the immediate vicinity of the workpiece but rather can also work in other rooms or departments.

In a preferred embodiment, the provision is made that the image recorder is a television camera, it-being recommended that the monitor is a television screen.

The apparatus of this invention is not limited to a specific splitting tool but rather the provision can be made that the splitting tool is a band saw or that the splitting tool acts in several planes, for example being a frame saw, and that the screen displays lines symbolizing the various dividing planes, particularly the planes wherein the saws of the frame saw are active. The apparatus according to the invention can also be utilized in conjunction with a circular saw or a finishing circular saw.

In one embodiment of an apparatus according to this invention, the provision can be made that additionally at least one further line is provided on the monitor, adjustable transversely to the line symbolizing the dividing plane, and that the further line can be set at a distance from the line symbolizing the first dividing plane which distance corresponds to the distance of a second dividing plane from the first dividing plane. This embodiment offers the operator the possibility of setting up the cutting guide as early as during the first cut so that also the second cut can be optimally guided, if a workpiece having a specific width is to be produced. Moreover, this embodiment offers the possibility of recognizing whether the desired workpiece can at all be made from the workpiece to be divided. This embodiment can also be utilized for making a V-type cut and, respectively, for the machining of wood according to specifications.

In a preferred embodiment of the invention, the provision is made that the monitor is arranged at the control desk of the apparatus in a position wherein it can be observed by the operator sitting at this desk.

In an advantageous embodiment of the invention, the provision is made that the line(s) is (are) represented by a (rubber) string or a rod attached to the monitor at the housing of the latter. Alternatively, it is possible that the at least one line is a line electronically generated on the monitor. The line on the monitor can also be a line written on the monitor by means of a pen (e.g. OCR signer).

In one embodiment, the provision can be made that the outer contour of the cross section of the new workpiece, or several of such workpieces, to be produced by splitting from the workpiece, is reproduced on the monitor. This embodiment is especially useful in connection with an embodiment wherein at least two lines are located on the monitor, of which at least one is adjustable.

Another embodiment of this invention provides that the image recorder and/or the camera is mounted at the dividing tool and/or to the frame thereof at a level lying above that of the workpiece to be split up. This results in an especially satisfactory overview advantageous, in particular, for the machining of conical workpieces (wooden logs).

A practical embodiment of the invention resides in that the at least one line symbolizing the dividing plane on the monitor can be shifted, for adjusting the apparatus, into a position coinciding with the image of the cutting plane on the monitor.

Advantageously, the feature is provided according to this invention that the dividing tool is fixedly arranged and the workpiece is movable on a conveyor carriage relatively to the dividing tool.

BRIEF DESCRIPTION OF THE DRAWINGS

Additional details and features of the invention and the mode of operation with the aid of the apparatus of this invention can be seen from the following description of the embodiments illustrated in the drawings wherein.

DETAILED DESCRIPTION OF THE INVENTION

Figure 1:
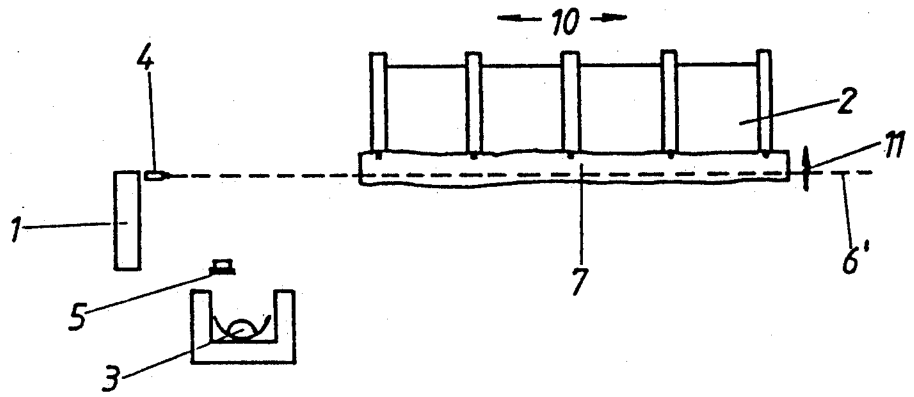
FIG. 1 shows the apparatus in a top view.
Figure 2:
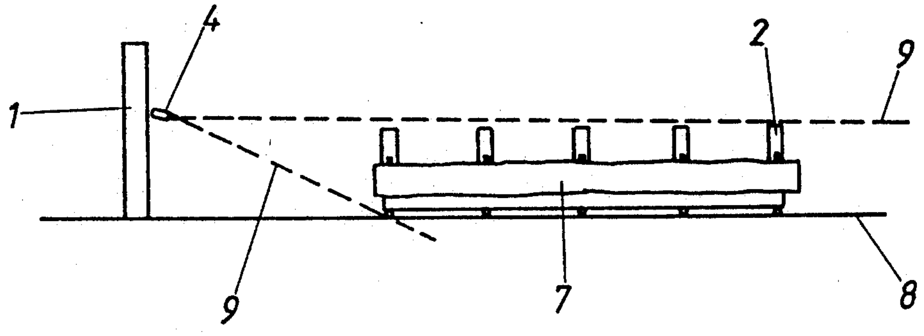
FIG. 2 shows the apparatus from the side.

In the embodiment illustrated in FIGS. 1 and 2, the dividing apparatus is a band saw 1 and the workpiece 7 to be divided, round timber, is fixedly disposed on a band saw carriage 2. The band saw carriage 2 can be adjusted in the direction of double arrow 11 so that the workpiece 7 can be aligned with respect to the band saw 1. In order to perform the splitting work, the workpiece 7 is moved on the band saw carriage 2 toward the band saw 1 in the direction of double arrow 10.

Beside the frame of the band saw 1 and in the proximity thereof, a camera 4 is adjustably mounted in the cutting plane as an image recording unit. The camera 4 is not to touch the dividing tool or a part thereof since this would result in interfering vibrations.

In opposition to the operator at the control desk 3, a monitor 5 is set up which, in case the camera 4 is designed as a television camera, is made to be a television screen.

It can be seen from the illustration of FIG. 2 that the camera 4 is arranged in the proximity of the band saw 1 in such a way that it looks on the workpiece 7 obliquely from above, i.e. that it is mounted at a level lying above the workpiece 7 to be split up, so that the viewing angle 9 encompasses the entire workpiece and the band saw carriage 2 movable on tracks 8.

Figure 3:
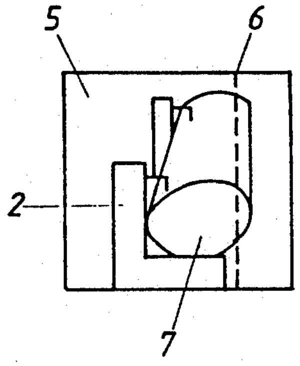
FIG. 3 is a schematic view of a monitor on the switching desk.

FIG. 3 shows the image of the band saw carriage 2 and of the workpiece 7 (round timber) produced on the monitor 5.

It can furthermore be seen from FIG. 3 that a line 6 is provided on the monitor 5. The line 6 can be a simple rod adjustably arranged at the monitor 5, or also a rubber band or a line produced on the screen with a pen. However, it is preferred that the line 6 is produced in the monitor 5 electronically.

The line 6 symbolizes the plane 6' (FIG. 1) in which the band saw 1 is effective. The line 6 is adjustable on the monitor 5 so that, in case of remounting of the camera 4 and/or of the band saw 1, the line 6 can be correspondingly aligned in the dividing plane 6'.

Figure 4:
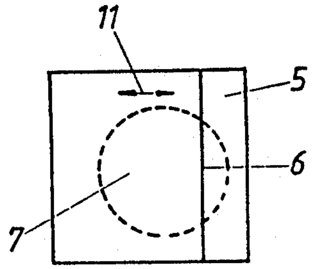
FIGS. 4–11 show various possibilities of locating lines on the monitor.

FIG. 4 once again shows the image on the monitor 5 in a schematic view. It can be seen that, by adjusting the band saw carriage 2 in the direction of double arrow 11, the cutting plane 6', symbolized by the line 6 on the manitor 5, can be aligned with respect to the workpiece 7 to be divided so that optimum guidance of the cut is achieved. This is of importance, for example, for the first-time working of round timber in order to remove slabs therefrom since unnecessary waste (slabs which are too thick) should be avoided.

Figure 5:
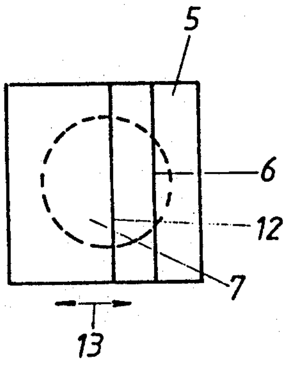

In the embodiment shown in FIG. 5, a further line 12 is provided in addition to line 6 on the monitor 5; this further line is adjustable (double arrow 13) mechanically or in the scanning field of the monitor with the aid of a program provided for this purpose. The spacing of line 12 from the zero line 6 can be set, for example, to the distance corresponding to the width of a workpiece to be made from the workpiece 7. This embodiment is especially suited for a V-cut and, respectively, for the dividing of logs into wood according to a specification.

Figure 6:
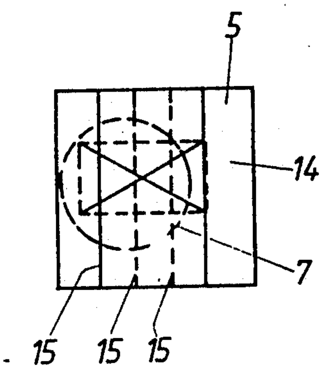

FIG. 6, finally, shows an embodiment with a zero line 6 and several movable lines 15. This embodiment is preferably employed for frame saws.

FIG. 6 also indicates that it is possible to generate on the monitor 5 an image symbolizing the outer contour of the workpiece to be manufactured, this being a rectangle in the illustrated embodiment, so that the operator can determine, from the monitor 5, whether it is at all possible to produce this workpiece from the workpiece blank 7. If the answer is in the positive, after checking the monitor 5, then the workpiece 7 can be aligned, for example by adjusting the band saw carriage 2 in the direction of double arrow 11, with respect to the zero line 6 in such a way that a maximally advantageous cutting guidance is ensured for the first cut and the subsequent cuts.

FIGS. 7–11 show schematically monitors with images as they are obtained in case the camera 4 is arranged, as shown in FIG. 2, above the workpiece (e.g. the log 7) to be divided.

Figure 7:
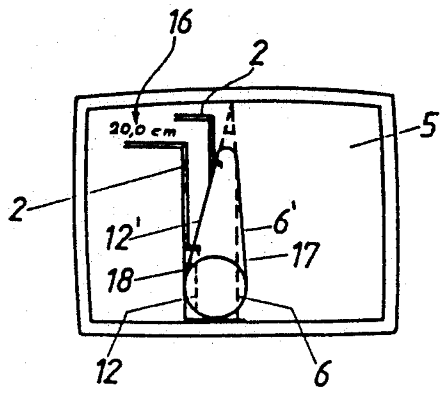

The illustration of FIG. 7 first of all shows the two lines 6 and 12 (as in FIG. 5) and their alignment lines 6' and 12', respectively. In the example of FIG. 7, the spacing between the zero line 6 and the adjustable line 12 is set at "20.0 cm", this value being displayed at 16 on the monitor. The alignment lines 6' and 12' emanate from points 17, 18 wherein the lines 6 and 12 intersect with the outer contour of the log 7 at the top.

Figure 8:
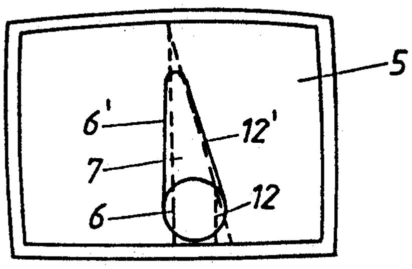

While FIG. 7 shows the alignment of a "band saw, left", FIG. 8 shows the analogous case for a "band saw, right".

Figure 9:
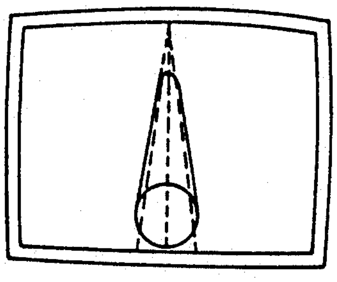
Figure 10:
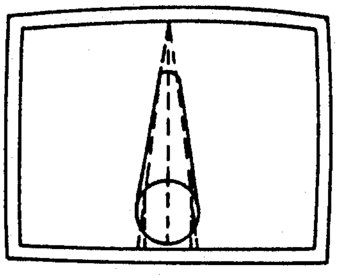
Figure 11:
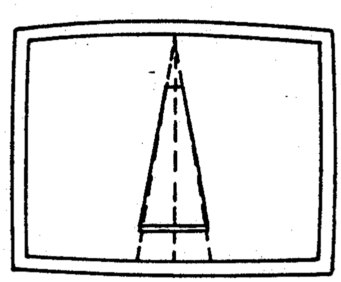

FIGS. 9-11 show illustrations corresponding analogously to FIG. 7, produced with the use of frame saws (FIG. 9), double-band saws and frame saws (FIG. 10), and, respectively, in case of circular trimming saws (FIG. 11) when the camera 4 is arranged above the workpiece.

The camera 4 can also be equipped with a zoom lens. This embodiment makes it possible in each case to vary (readjust) the zoom setting (optionally automatically) so that the dimension (e.g. the diameter) of the workpiece 7 is in all instances displayed on the screen 5 with identical size, independently of the distance from the lens of camera 4.

Figure 12:
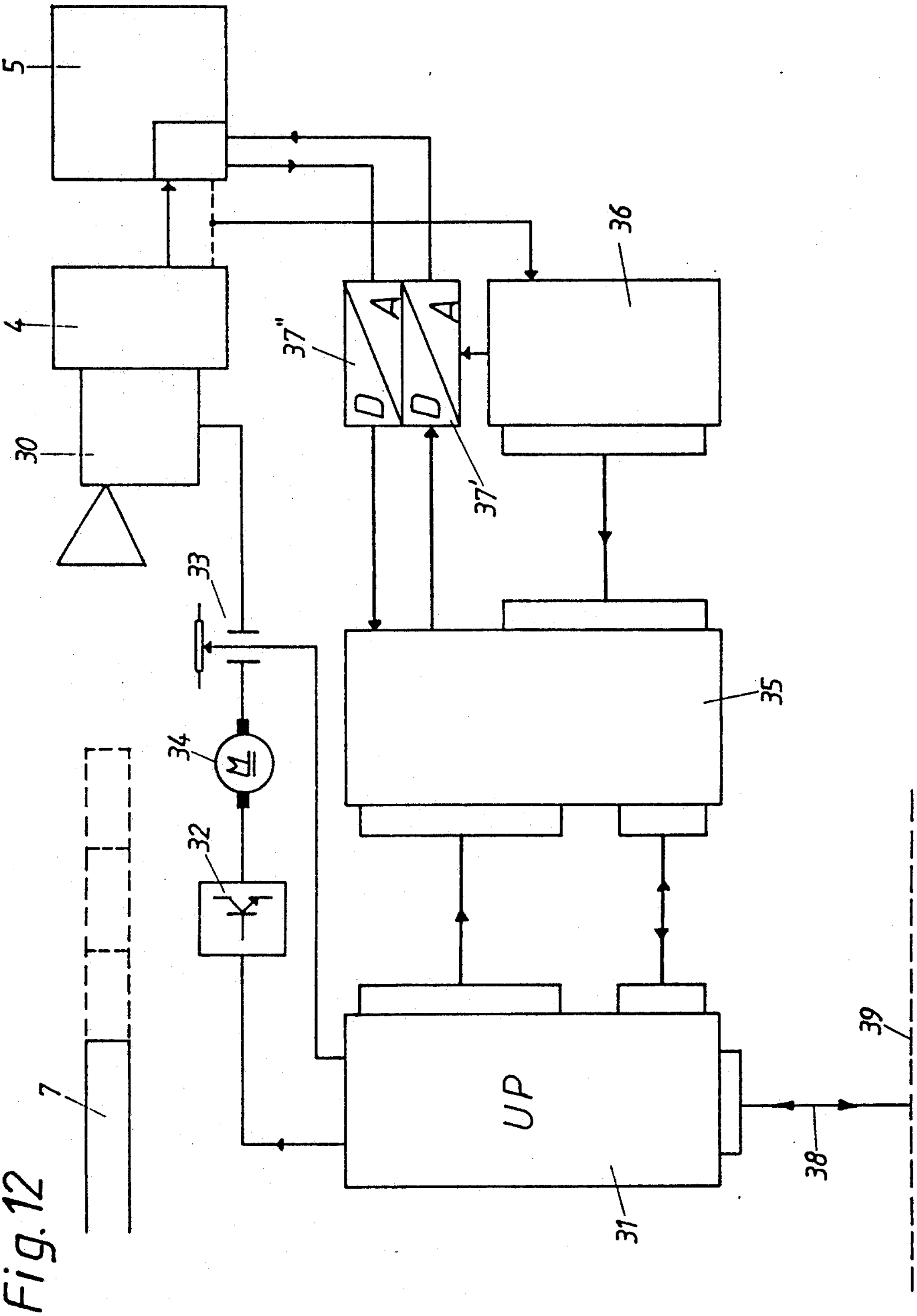
FIGS. 12 and 13 are circuit diagrams of embodiments of the apparatus according to the invention.
Figure 13:
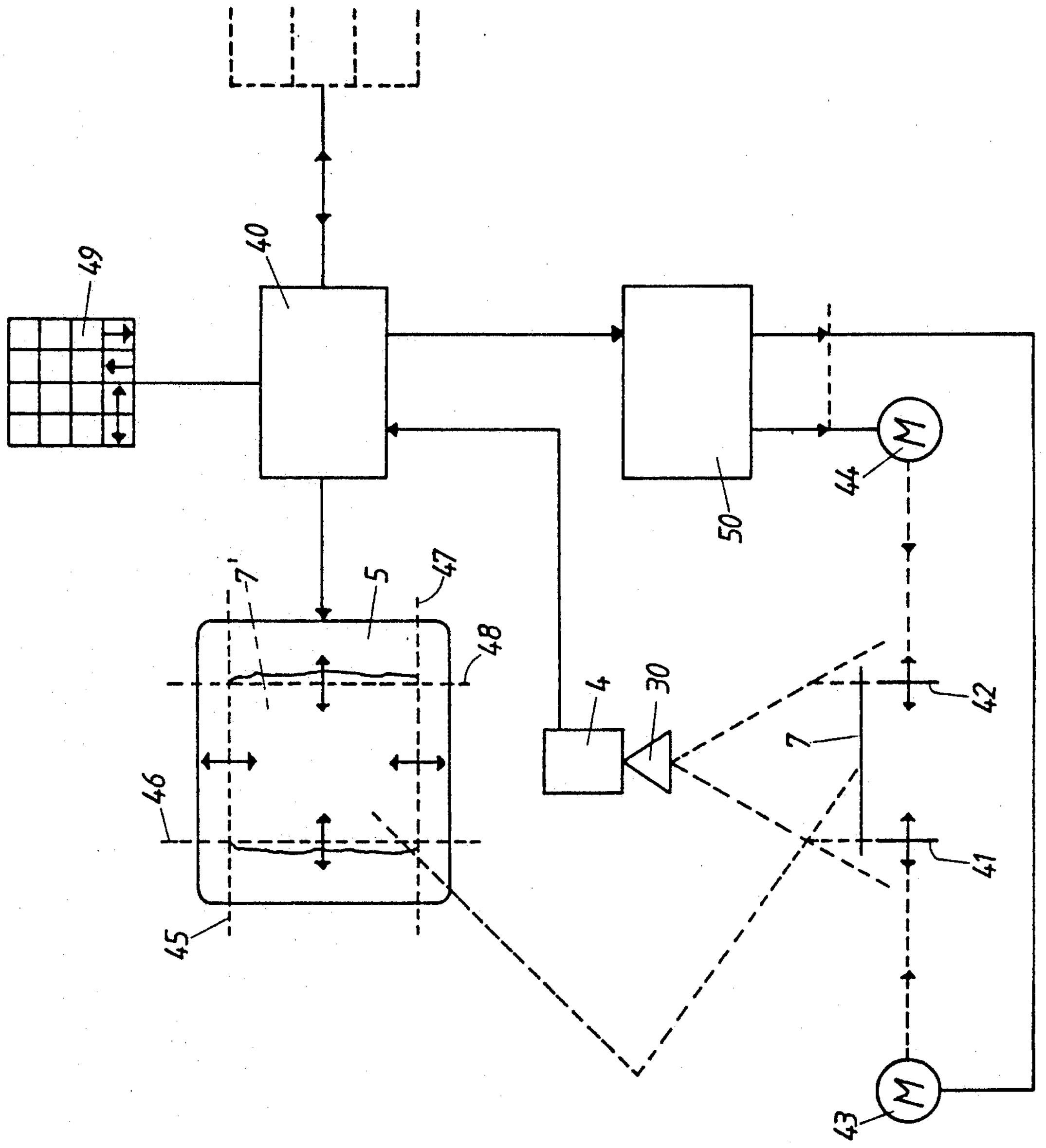

Examples for the design of the electronic section of the apparatus of this invention are illustrated in FIGS. 12 and 13. These will be explained hereinbelow:

In FIG. 12, a microprocessor unit 31 accepts data from the PC or central computer 39 regarding a cutting site 38 and controls, by way of a driver stage 32, the motor 34 for the zoom adjustment of the zoom lens 30 of camera 4. The motor 34 is, for example, a DC synchronous motor or a stepping motor.

The actual value return signal to the microprocessor unit is transmitted via the generator 33 which can be a potentiometer, a pulse generator, or the like.

The actual value return signal is corrected by way of a corresponding functional curve (zoom ratio=function of the position return signal) and compared to the desired value (from PC or central computer) and readjusted.

In the image storage unit 35, the data for diverse linear or punctiform markers, as well as alphanumerical symbols (for display in the monitor) are stored and/or deposited.

The address counter 36 serves for readout from the image storage unit for indication on the monitor 5 via the D/A converter 37'.

An analog-to-digital converter 37" that may be included in certain cases serves for object recognition, measurement, selective zoom adjustment, and so forth.

In case of FIG. 13, intended especially for the division of panels and similar workpieces, the control 40 shown in FIG. 12 is utilized in order to control the movements of two separating units 41 and 42 by way of their drive mechanisms 43 and 44. Similar drive mechanisms are provided for the two separating units (not shown) acting in directions perpendicular to the separating units 41, 42, the cutting planes of which are symbolized by the lines 45, 47. The position of the lines 45, 46, 47 and 48 on the monitor 5 is adjusted to the desired position with the aid of the keyboard 49, with observation of the monitor 5 on which an image 7' of the workpiece 7 is displayed. The thus-given desired values are transmitted via the control unit 40 by way of a positional control unit 5 to the adjustment drive units 43, 44 of the separating devices 41, 42 and thus the separating devices 41, 42 are readjusted by follow-up.

If the apparatus of this invention is used in frame saws or similar dividing tools generating a large amount of dust and wood fragments during operation, it is recommended to mount the camera 4 at a distance from the dividing tool.

What is claimed is:

1. In apparatus for dividing workpieces (7), wherein a tool (1) having at least one dividing plane for dividing the workpiece (7) and the workpiece (7) are movable relative to each other along a predetermined travel route (arrow 10) for performing the dividing work, and wherein the workpiece (7) is fixed on a support (2) with an image recorder (4) covering the workpiece; the improvement in which the image recorder (4), detecting at least the end face of the workpiece (7) to be divided, is mounted in at least one said dividing plane (6') of the dividing tool, a monitor (5) to which the image recorder (4) is connected, on which there is produced an image of at least the end face of the workpiece (7) to be divided which faces the dividing tool (1) and the image recorder (4); means for displaying on the monitor at least one line (6) symbolizing the plane (6') in which the dividing tool (1) is effective; and means for moving said support (2) transversely to said plane (6') to position the workpiece (7) such that the tool (1) will divide the workpiece (7) at a desired location as depicted by the position of said line (6) on said image of the workpiece that appears on the monitor (5).

2. Apparatus according to claim 1 wherein the dividing tool acts in several planes and wherein plural lines (6, 15) are provided on the screen (5), these lines symbolizing the several dividing planes (6').

3. Apparatus according to claim 1, wherein at least one further line (12, 15) appears on the monitor (5) and is adjustable transversely to the line (6) symbolizing the dividing plane (6); and means for setting the further line (12, 15) at a distance from the line (6) symbolizing the first dividing plane (6) which distance corresponds to the distance of a second dividing plane from the first dividing plane (6').

4. Apparatus according to claim 1, wherein the monitor (5) is arranged at a control desk (3) of the apparatus in a position wherein it can be observed by an operator sitting at this desk.

5. Apparatus according to claim 1, wherein said at least one line (6, 12, 15) is represented by filaments attached to the monitor (5) on a housing of the monitor (5), said filaments being in contact with the screen of the monitor (5).

6. Apparatus according to claim 1, wherein said at least one line (6) is a line electronically generated on the monitor (5).

7. Apparatus according to claim 1, wherein the outer contour (14) of the cross section of a product to be produced by dividing the workpiece (7), is reproduced on the monitor.

8. Apparatus according to claim 1, further comprising means for shifting said at least one line (6) symbolizing the dividing plane (6') on the monitor (5), for adjusting the apparatus into a position coinciding with the image of the dividing plane (6') on the monitor (5).

9. Apparatus according to claim 1, wherein the image recorder (4) is mounted in the proximity of the dividing tool (1).

10. Apparatus according to claim 1, wherein the image recorder (4) is mounted in the zone of the output cutting side of the workpiece (7).

11. Apparatus according to claim 1, wherein the image recorder (4) is mounted on the starting cutting side of the workpiece (7).

* * * * *